(12) United States Patent
Sæther et al.

(10) Patent No.: US 11,812,708 B2
(45) Date of Patent: Nov. 14, 2023

(54) LIGHTING SYSTEM AND A METHOD FOR IMPROVING GROWTH CONDITIONS FOR PLANTS

(71) Applicant: Mobile Lighting Rig AS, Stavanger (NO)

(72) Inventors: Kolbjørn Sæther, Stavanger (NO); Tore Kolås, Trondheim (NO)

(73) Assignee: Mobile Lighting Rig AS, Stavanger (NO)

( * ) Notice: Subject to any disclaimer, the term of this patent is extended or adjusted under 35 U.S.C. 154(b) by 0 days.

(21) Appl. No.: 18/010,148

(22) PCT Filed: Jun. 25, 2021

(86) PCT No.: PCT/NO2021/050155
§ 371 (c)(1),
(2) Date: Dec. 13, 2022

(87) PCT Pub. No.: WO2021/262010
PCT Pub. Date: Dec. 30, 2021

(65) Prior Publication Data
US 2023/0240196 A1    Aug. 3, 2023

(30) Foreign Application Priority Data

Jun. 25, 2020   (NO) .................... 20200749

(51) Int. Cl.
*A01G 7/04*     (2006.01)
*F21V 21/30*    (2006.01)
*F21Y 115/10*   (2016.01)

(52) U.S. Cl.
CPC .............. *A01G 7/045* (2013.01); *F21V 21/30* (2013.01); *F21Y 2115/10* (2016.08)

(58) Field of Classification Search
CPC .......... A01G 7/04; A01G 7/045; A01G 9/249; F21V 21/30; F21Y 2115/10
See application file for complete search history.

(56) References Cited

U.S. PATENT DOCUMENTS

| 6,874,275 B2 | 4/2005 | Saether et al. |
| 2010/0259190 A1* | 10/2010 | Aikala .................. H01L 33/507 257/E33.061 |

(Continued)

FOREIGN PATENT DOCUMENTS

| EP | 1164830 | 1/2002 |
| EP | 3192350 | 7/2017 |
| WO | 2012147391 | 11/2012 |

OTHER PUBLICATIONS

NO Search Report for Norwegian Patent Application No. 20200749, dated Jan. 25, 2021.

(Continued)

*Primary Examiner* — Thomas M Sember
(74) *Attorney, Agent, or Firm* — ANDRUS INTELLECTUAL PROPERTY LAW, LLP (57) ABSTRACT

A lighting system is for providing photosynthetically stimulating artificial light to a specified target area where such artificial light is needed. The lighting system has at least one luminaire with a light source. The luminaire emits photosynthetically stimulating light at a narrow beam angle of less than and including 20° (FWHM). The lighting system has means for positioning the at least one luminaire at a distance of minimum 20 m from the specified target area measured in a light beam direction, and the luminaire is adapted to illuminate the specified target area with a minimum photosynthetic photon flux density of 140 μmol/s/m². A method is for improving the growth conditions for plants in need of (Continued)

light at a specified target area by exposing the plants to a photosynthetically artificial light from a light source.

17 Claims, 5 Drawing Sheets

(56) References Cited

U.S. PATENT DOCUMENTS

| | | | | |
|---|---|---|---|---|
| 2011/0115385 | A1* | 5/2011 | Waumans | A01G 9/249 |
| | | | | 315/149 |
| 2012/0218750 | A1* | 8/2012 | Klase | F21V 5/007 |
| | | | | 362/231 |
| 2014/0204567 | A1 | 7/2014 | Cheng et al. | |
| 2015/0016119 | A1 | 1/2015 | Inada et al. | |
| 2015/0305252 | A1* | 10/2015 | Klase | F21V 5/007 |
| | | | | 362/231 |
| 2015/0351325 | A1 | 12/2015 | Shelor et al. | |
| 2016/0192598 | A1* | 7/2016 | Haggarty | H05B 47/19 |
| | | | | 315/297 |
| 2016/0341378 | A1 | 11/2016 | Donners et al. | |
| 2019/0000020 | A1 | 1/2019 | Theisen et al. | |

OTHER PUBLICATIONS

International Search Report and the Written Opinion for PCT/NO2021/050155, dated Sep. 23, 2021.

* cited by examiner

LIGHTING SYSTEM AND A METHOD FOR IMPROVING GROWTH CONDITIONS FOR PLANTS

CROSS-REFERENCE TO RELATED APPLICATIONS

This application is the U.S. national stage application of International Application PCT/NO2021/050155, filed Jun. 25, 2021, which international application was published on Dec. 30, 2021, as International Publication WO 2021/262010 in the English language. The International Application claims priority of Norwegian Patent Application No. 20200749, filed Jun. 25, 2020. The international application and Norwegian application are both incorporated herein by reference, in entirety.

FIELD

The current invention relates to a lighting system comprising luminaires for illuminating plants to improve their growth conditions. The plants may cover an area such as at least one area of a grass pitch of a sports stadium. The lighting system may comprise one or more luminaires for illuminating the plants. The plants may cover an area such as a grass field of a sports stadium, a golf course or a lawn. The lighting system can be standalone without presence of natural light or providing supplementary light to sunlight. The invention also relates to a method for improving growth conditions for plants.

BACKGROUND

Sports stadiums for soccer have grown in size as soccer has increased in popularity and monetary turnover. Stadiums with a capacity of from 40,000 to 80,000 spectators are well known. Ensuring a top-quality pitch of natural grass can be challenging, particularly in the big stadiums. The walls and roof of the stadiums block sunlight from reaching the pitch. As the grass plants need light for photosynthesis, lack of sunlight leads to poor grass growth and poor grass quality.

The same problem applies to other sports stadiums as well, e.g. to tennis courts with a grass court surrounded by high stands, to football stadiums with high stands, as well as rugby stadiums. Other sports activities are also performed on natural grass turfs. Even training fields not surrounded by high stands need supplementary lighting due to high wear and tear.

It is well known that artificial light is used to improve plant growth in green houses.

The need for providing artificial light to stimulate photosynthesis for grass pitches in stadiums is known. Patent EP1164830B1 discloses a system for promoting growth conditions for grass and other plants in grass pitches for outdoor and indoor sports and athletics, particularly where shades from stands reduce the natural light conditions. The system comprises a movable unit carrying luminaires for illuminating the grass pitch. The system is arranged to act as a mobile greenhouse, and for being placed onto the grass pitch. Similar movable units have been developed over the past 20 years. The luminaires are typically positioned above the ground at a height from 1 m to 4 m.

The units need storage space between active operation, and this is a disadvantage. Stadiums, and especially old stadiums, are not provided with storage space for movable units. Thus, the movable units are transported out of the stadiums when they are not in use. As old stadiums typically are located in cities, availability of storage space outside the stadiums may also be limited. The units are wheel mounted for mobility, and the wheels wear on the grass, which is a disadvantage. Alternatives to movable units are disclosed in U.S. Pat. No. 6,874,275 and patent application EP 3192350. Patent application EP 3192350 discloses a lifting/lowering device comprising lamps that are lowered down to a working distance of 0.05 to 2.0 m above a lawn to provide sufficient artificial light to promote growth of grass. The lamps may be LED lamps developed specially for photosynthesis and for an illumination level of 100 to 200 $\mu mol/s/m^2$ at the working distance.

Stadiums also requires artificial light for floodlighting sports events, particularly during events taking place when there is little sunlight, such as late in the evening. Floodlights for stadiums are well known in the art. Advanced, modern flood lighting systems today are known to utilise light sources in the form of light emitting diodes (LEDs) and even to be arranged to provide light shows. Typically, the distance from the field or pitch to the light sources are more than 30 meters, and the distance may exceed 50 meters.

It is well known that illuminance decreases with the square of distance. This is the so-called inverse-square law of lighting. E.g. increasing the distance between a light source and an illuminated area from 1 m to 10 m, decreases the illuminance on the area to 1%. Light from a modern flood-lighting system is inadequate in luminous intensity to promote growth of grass on a stadium. Due to the implications of the inverse-square law of lighting, it has become a belief by the skilled person that artificial light to promote growth of grass should be positioned close to the grass, and a distance of 4 meters appears to be an upper limit in the current practice.

SUMMARY

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

The beam angle is herein defined as the angle between the two directions opposed to each other over the beam axis for which the luminous intensity is half that of the maximum luminous intensity. This corresponds to the so-called full width half maximum (FWHM) beam angle.

In a first aspect, the present invention relates to a lighting system for providing photosynthetically stimulating artificial light to a specified target area where such artificial light is needed, said lighting system comprising at least one luminaire (1) with a light source. The luminaire (1) emits photosynthetically stimulating light at a narrow beam angle of less than and including 20° (FWHM). The lighting system comprises means for positioning the at least one luminaire at a distance of minimum 20 m from the specified target area measured in a light beam direction, and the luminaire is adapted to illuminate the specified target area with a minimum photosynthetic photon flux density of 140 $\mu mol/s/m^2$.

Photosynthetically stimulating light is also termed growth light. PPFD is the number of photosynthetically active photons (in the PAR region; 400-700 nm) that fall on a square meter of a given surface each second ($\mu mol/s/m^2$).

The luminaire may emit photosynthetically stimulating light at a narrow beam angle of more than and including 3° (FWHM), such as more than and including 4°, such as more than and including 5°.

The narrow beam angle (FWHM) may be from 3° to 15°, such as from 4° to 15°, such as from 5° to 15°, such as from 6° to 15°. The narrow beam angle (FWHM) may be from 3° to 10°, such as from 4° to 10°, such as from 5° to 10°, such as from 6° to 10°.

The luminaire may illuminate the specified target area with a minimum photosynthetic photon flux density (PPFD) of 140 µmol/s/m² (10,000 lux) at a distance of minimum 25 m, such as 30 m, such as 35 m, such as 40 m, such as 45 m, such as 50 m or more from the luminaires measured in the light beam direction.

The luminaire may illuminate the specified target area with a minimum photosynthetic photon flux density (PPFD) of 210 µmol/s/m² (15,000 lux), such as 280 µmol/s/m² (20,000 lux), such as 350 µmol/s/m² (25,000 lux) at a distance of minimum 20 m, such as 25 m, such as 30 m, such as 35 m, such as 40 m, such as 45 m, such as 50 m or more from the luminaires measured in the light beam direction.

The target area may be illuminated with a lighting uniformity of at least 0.6, such as a lighting uniformity of 0.8, such as a lighting uniformity of more than 0.8. Lighting uniformity is herein defined as the ratio of minimum illuminance to average illuminance on a surface.

The luminaire may comprise light sources in the form of light emitting diodes (LED). The luminaires may also comprise light sources in the form of laser diodes. The luminaires may comprise high pressure sodium (HPS) lamps. The luminaires may comprise metal halide (MH) lamps.

The luminaire may emit light with a correlated colour temperature of more than 2700 K. This may include white light with a correlated colour temperature such as 2700-3500 K (warm light), 3500-4500 K (neutral white), 4500-5500 K (cool white) or 5500-6500 K (cold light/daylight). The luminaire may also be comprised of light sources that emit in a narrower wavelength band such as light emitting diodes emitting blue light and red light.

The luminaire may be mounted in such a way that it is pointing in a fixed direction or that it can be tilted so that light can be emitted in several directions. The light sources in the luminaire may also be tiltable relative to the luminaire. The luminaires may comprise adjustable optical devices that may alter the direction of the beam of light emitted from the luminaire.

The means for positioning the at least one luminaire may comprise a rim portion of a roof of a sports stadium. The luminaire may be movably mounted to the rim portion of the stadium roof. The luminaire may be mounted to a movable object arranged onto the rim portion of the stadium roof. In an alternative embodiment, the means for positioning the at least one luminaire may comprise at least one light mast to which the luminaire is mounted. The light mast may be positioned off the grass field of a sports stadium. The light mast may be positioned in a green house. The light mast may be positioned on a golf course. On a golf course the mast may be telescopic and arranged to be hidden when not in use. The masts may revolve around their longitudinal axis. The masts may be mounted on a wagon. The light mast may be positioned at an agricultural field. The agricultural field may be a strawberry field.

The lighting system may comprise a plurality of masts, and each mast may be provided with at least one luminaire.

In an alternative embodiment the means for positioning the at least one luminaire may comprise a tower. In a further alternative embodiment, the means for positioning the at least one luminaire may comprise a stadium building, such as a wall, a roof above a tribune, platform or stand. In a further alternative embodiment, the means may comprise a construction that spans across and above a grass field at a sports stadium. The at least one luminaire may be suspended from the construction that spans across and above a grass field. The means for positioning luminaires may comprise a combination of two or more of a rim portion of a roof of a sports stadium, a mast, a tower, a stadium building, a wall, a roof above a tribune, platform or stand, and a construction that spans across and above a grass field at a sports stadium.

The luminaires comprising the lighting system may each emit a circular beam that provides a circular shaped footprint on the grass field when the light is directed vertically downwards and an oval shaped footprint when the luminaire illuminates the grass field at an angle. The size of a circular or oval footprint depends on the beam profile of the luminaire and the distance from the luminaire to the grass field.

The targeted area of the lighting system may with benefit be divided into a regular grid pattern or alternatively a hexagonal pattern. The number of points in the grid may be equal to the number of luminaires in the lighting system. If the targeted area is smaller than the overall capacity of the lighting system, the number of activated luminaires in the lighting system may be equal to the number of points within the target area.

The luminaires comprising the lighting system may be mounted in such a way that the center axis or center beam of each luminaire is directed towards a dedicated position on the target area corresponding to a grid point. The lighting system may in this case be arranged in such a way that circular or oval footprints from individual luminaires are partly overlapping.

The potential to obtain uniform lighting levels is critical with respect to energy consumption and may also be critical with respect to the resulting visual appearance of the grass field. The arrangements related to the footprints of the individual luminaires are critical in order to obtain acceptable lighting uniformity. The inventors have experienced by simulations that acceptable lighting uniformity may be obtained when footprints from individual luminaires overlap in such a way that the intensity levels of two neighbouring footprints both drop to approximately 50% halfway from the center points of the two footprints.

The conclusion from this is that the lighting system, in order to obtain acceptable uniformity should take into account: the number of luminaires, the beam profile of the luminaires and the distance and angle from the luminaire to the corresponding grid point on the grass field. By optimising these factors in combination, it should be possible in a typical scenario to obtain a uniformity of more than 0.80.

The lighting system may comprise a monitoring system for monitoring and estimation of the needs for artificial lighting on all parts of the target area in order to obtain acceptable growth conditions for the grass. The lighting system may comprise a monitoring system for monitoring light conditions, including daylight conditions, in at least an area of a grass field. The monitoring system may comprise a camera or a plurality of cameras.

The lighting system may be adapted to distribute floodlight for a sporting event. In general, floodlighting does not have the same requirements to intensity as artificial lighting for grass growth i.e. growth lighting. Each luminaire may be suppling light to a fixed area within the target area, and each luminaire can be dimmed up and down or turned on or off individually.

The invention also concerns a floodlighting system for illuminating a grass field of a sports stadium, wherein the floodlighting system comprises the lighting system as described above. The stadium may be a stadium intended for sporting activities such as a soccer, American football, rugby, baseball, cricket, golf, tennis or similar.

In a second aspect, the invention relates to a method for improving the growth conditions for plants in need of light at a specified target area by exposing the plants to a photosynthetically artificial light from a light source. The method comprises to provide a luminaire comprising the light source, said luminaire is adapted to emit the photosynthetically artificial light at a beam angle (FWHM) of less than and including 20°. The light source is positioned at a distance of minimum 20 m from the specified target area, and the plants in the specified target area are illuminated with a minimum photosynthetic photon flux density of 140 µmol/s/m$^2$.

The method may comprise to provide a luminaire that emits photosynthetically stimulating light at a narrow beam angle of more than and including 3° (FWHM), such as more than and including 4°, such as more than and including 5°.

The method may comprise to provide a luminaire that emits photosynthetically stimulating light at a narrow beam angle from 3° to 15°, such as from 4° to 15°, such as from 5° to 15°, such as from 6° to 15°. The narrow beam angle (FWHM) may be from 3° to 10°, such as from 4° to 10°, such as from 5° to 10°, such as from 6° to 10°.

The method may comprise to illuminate the target area with a minimum of 10,000 lux or 140 µmol/s/m$^2$ at a distance of minimum 25 m, such as 30 m, such as 35 m, such as 40 m, such as 45 m, such as 50 m or more from the light source measured in the light beam direction. The method may comprise to illuminate the target area with a minimum of 210 µmol/s/m$^2$ (15,000 lux), such as 280 µmol/s/m$^2$ (20,000 lux), such as 350 µmol/s/m$^2$ (25,000 lux) at a distance of minimum 20 m, such as 25 m, such as 30 m, such as 35 m, such as 40 m, such as 45 m, such as 50 m or more from the light source measured in the light beam direction.

The plants may be grass in a sports venue such as a sports stadium. The plants may be grass in a sports venue such as a golf course.

Having a lighting system which promotes plant growth arranged to be mounted to a fixed structure placed off a grass field of a stadium as the system for providing artificial light for the grass field, has several advantages. The known mobile lighting systems arranged to be positioned on a grass field are time consuming to operate. Staff must spend time positioning a movable rig or a plurality of movable rigs onto the field, and off the field, as well as moving them from one area of the field to another. Furthermore, the mobile lighting system occupies at least an area of the field for a period when in use, which may prevent other activities from being performed in the area of the field during the period. Having a lighting system mounted to a fixed structure off the field means it does not occupy any area of the field and that activation or deactivation of the system is fast and easy.

Another positive effect of the lighting system according to the invention compared to the prior art, is that the mobile rigs of the prior art require storage space for storage when not in use. The lighting system according to the first aspect of the invention would typically be fixed to a structure, such as a roof or a mast, or a plurality of masts, off the pitch, and would not need any storage space.

The lighting system according to the first aspect of the invention may typically be arranged to cast light in the spectrum range known as Photosynthetically active radiation (PAR), with wavelength ranging between 400 and 700 nanometres. As research indicates that grass may more efficiently use light in certain spectrums, particularly between 400 and 500 nanometres (blue light) and between 600 and 700 nanometres (red light), the lighting system may be arranged to emit light within one of or both of those spectrums. The lighting system may be arranged to emit light in a certain spectrum during a certain period of time and in another spectrum in another period of time. Emitting light at spectrums that are particularly beneficial for plant growth may be energy saving and advantageous especially at times when there is little need to use the lighting system to provide the grass plants with heat from the light.

The lighting system may comprise at least one luminaire comprising a light source in the form of a light emitting diode (LED). The lighting system may comprise a plurality of luminaires. All of, or some of, the plurality of luminaires, may comprise LEDs. LEDs may be highly advantageous for several reasons:

the light spectrum to be emitted may be tailored by using coloured LEDs;
LEDs may be energy efficient compared to other light sources;
LEDs can be dimmed or turned on and off instantly;
LEDs have a long life expectancy;
LEDs does not provide flickering; and
a small light source such as a LED makes it more feasible to obtain luminaires with a narrow beam angle.

As opposed to HPS lamps, which requires considerable time to turn back on again when it has been turned off, LEDs may be dimmed or turned on and off instantly.

At least one luminaire of the lighting system may emit light with a beam angle (FWHM) of substantially 12°. A luminaire of the lighting system may emit light with a smaller beam angle than 12°, such as 11°, such as 10°, such as 9°, such as 8°, such as 7, such as 6°, such as 5°, such as 4°, such as 3° (FWHM). A narrow beam of light may be very beneficial for supplying light from a luminaire to a delimited area of the grass field. Thereby it is possible, to a greater extent than it would be possible with light sources with a broader beam of light, to spend energy on illuminating an area of the grass field that requires artificial light, while limiting energy loss from illuminating an area of the grass field that does not require supplementary light. In some circumstances, it may be beneficial to have a luminaire emitting light having a broader beam of light, such that the luminaire covers a larger area of the grass field. This may be beneficial at the centre regions of a large target area such as a soccer pitch, e.g. to increase uniformity. However, closer to the edges of such an area the use of light with a narrow beam angle is highly beneficial in order not to waste light outside of the target area. Lighting with a narrow beam angle will therefore save energy. The narrow beam of light enables the luminaire to distribute light on a targeted area and reduce the amount of light outside the targeted area. The size and location of the target area may change rapidly due to variations in the natural daylight conditions. It may therefore be beneficial that all of the luminaires in the lighting system have a narrow beam angle. By turning such luminaires on or off it is fast and easy to illuminate a more confined target area, such as an area of a soccer pitch that is shaded from direct sunlight.

A light source or a luminaire of the lighting system may be tiltable, such that the direction of the light emitted from the luminaire may be changed. The light source or the luminaire may be tiltable in any direction. Having a tiltable light source or a luminaire makes it possible to shift the area of the grass field being exposed to light from the light source or the luminaire. This may be beneficial, e.g. to reduce the number of luminaires that are needed to supply lighting to a large area such as a soccer pitch. The luminaires may also be comprised of adjustable optical devices that can change the direction of the beam of light emitted from the luminaire. This may have the same benefits as a tiltable luminaire.

The lighting system may comprise a means for changing the beam angle of light emitted from the luminaire. A luminaire may be arranged with such beam changing means. A light source within the luminaire may be provided with beam changing means to change the beam angle of the luminaire. The beam changing means may be an optical device for focusing or dispersing light emitted from the light source. The beam changing means may be adjustable.

The growth lighting system may comprise a beam changing means for changing the beam profile of the light from a luminaire. Thereby, the radius of the light footprint from the luminaire may be increased or decreased.

The lighting system may comprise at least one luminaire that is mounted substantially at the height of a roof of a stadium. This may be of particular importance when the same luminaires are used both for stimulation of plant growth and for floodlighting of a stadium.

In order to save costs, it may be beneficial that some of the luminaires or some of the light sources in a luminaire can be adapted so as to provide growth light as well as floodlight, according to needs. Floodlighting generally have a beam angle of more than 20°. It may be useful to apply beam changing means for some of the luminaires in the lighting system, in order to change the narrow beam adapted for growth lighting into a wider beam adapted for floodlighting.

In general, several times more light is needed to provide growth lighting than to provide floodlighting to a stadium. A floodlighting system for a whole stadium may therefore be adapted to supply growth light to a delimited part of the field, e.g. ⅓ of the field. In order to do this adaption, it may be useful to apply luminaires that can be tilted or luminaires that comprise adjustable optical devices that may alter the direction of the beam of light emitted from the luminaire. Also, in order to do this adaption, it may be useful to apply luminaires with beam changing means.

BRIEF DESCRIPTION OF THE DRAWINGS

In the following is described examples of preferred embodiments illustrated in the accompanying drawings, wherein.

DETAILED DESCRIPTION OF THE DRAWINGS

In the figures, the reference numeral 1 indicates a luminaire. The luminaire 1 comprises a plurality of LEDs (not shown). The luminaire 1 comprises a frame 13. The luminaire 1 is shown with a fixing iron 15 for fasting the luminaire 1 to a support 2, as seen in FIGS. 4-7. The luminaire 1 comprises a tilting means 17 for adjusting the angle of the frame 13 relative to the fixing iron 15.

Figure 1:
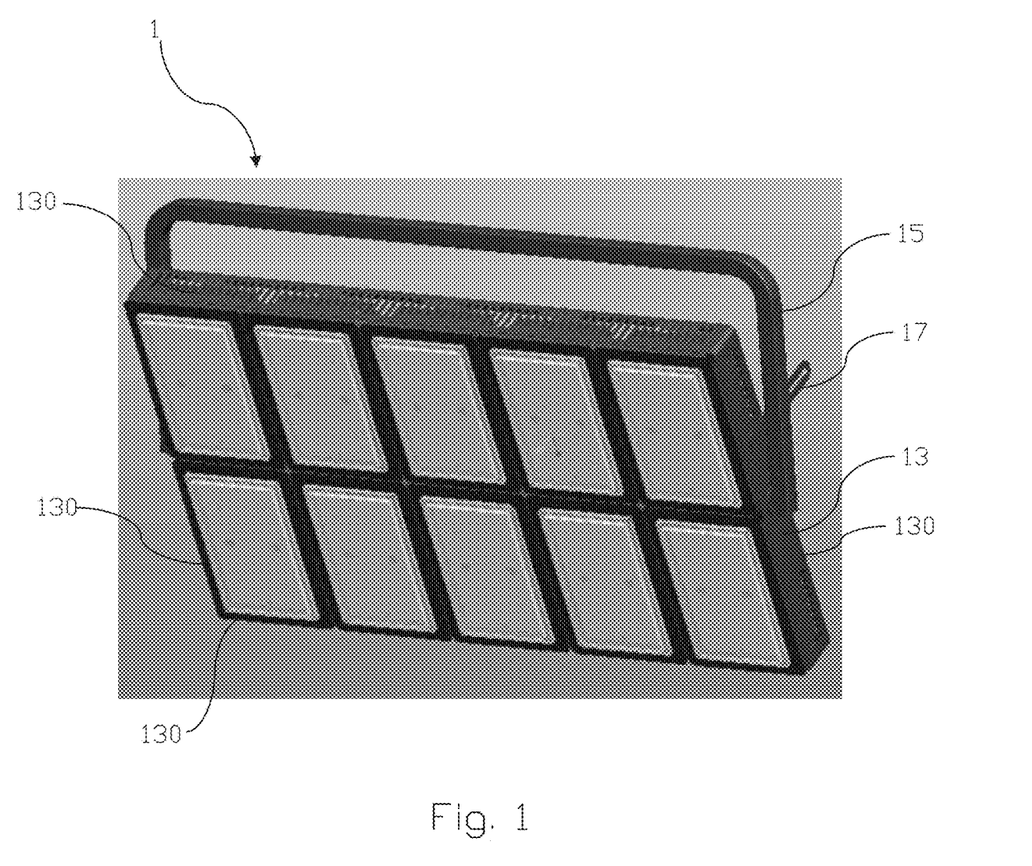
FIG. 1 shows a schematic drawing of a luminaire of the lighting system for stimulating growth of plants.
Figure 8:
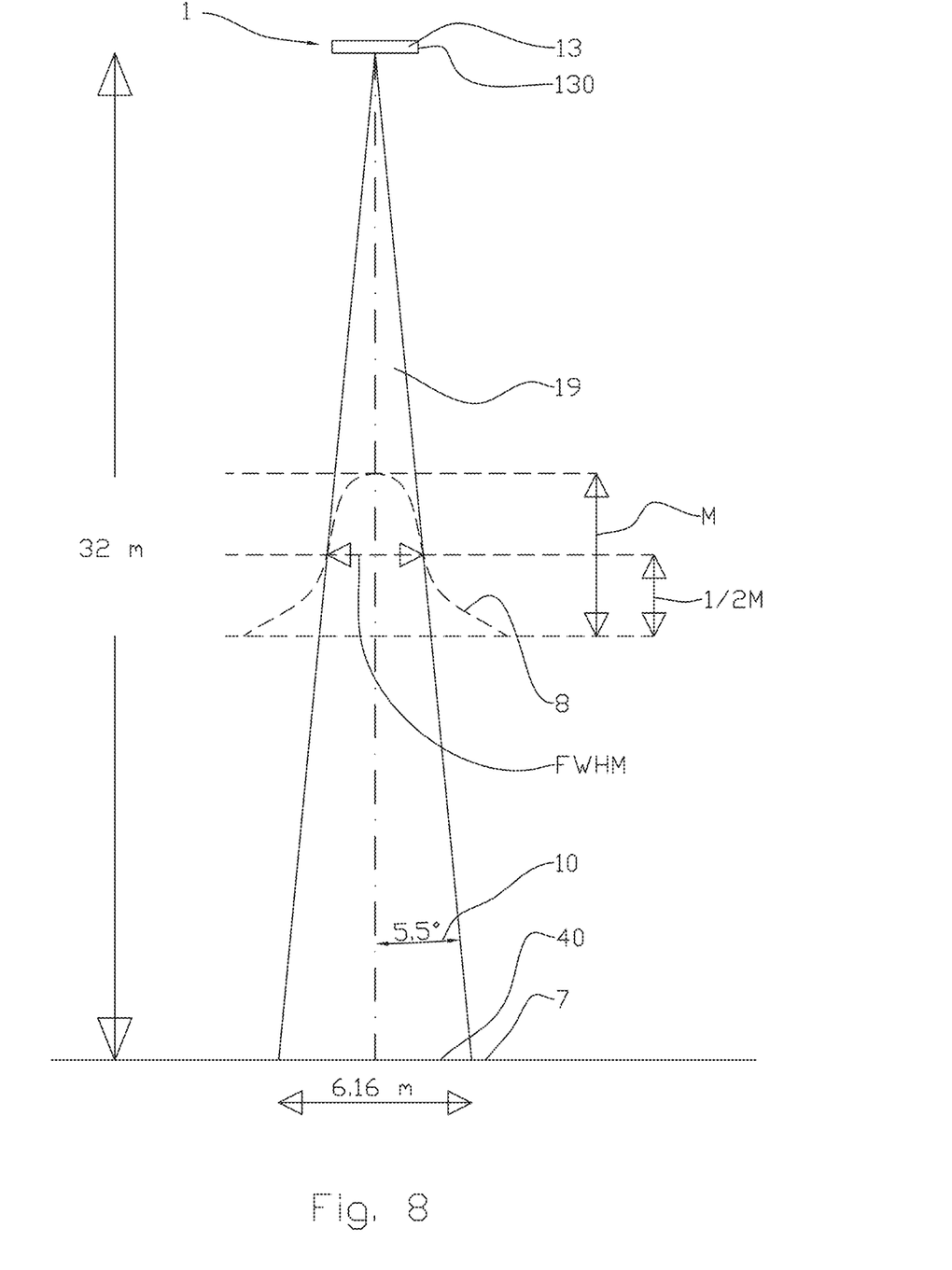
FIG. 8 shows schematically and not to scale a footprint on the ground of one beam of light from one luminaire, and a graph showing the full width half maximum (FWHM) to define the beam angle.

The luminaire 1 is supplied with electricity at a sufficient rate, such as of approximately 2500 W. The LEDs may emit white light with a correlated colour temperature of approximately 4000 K. The luminaire 1 emits light with a narrow beam of light 19. The luminaire 1 may emit light at a beam angle 10 of 5.5° as seen in FIG. 8.

Figure 2:
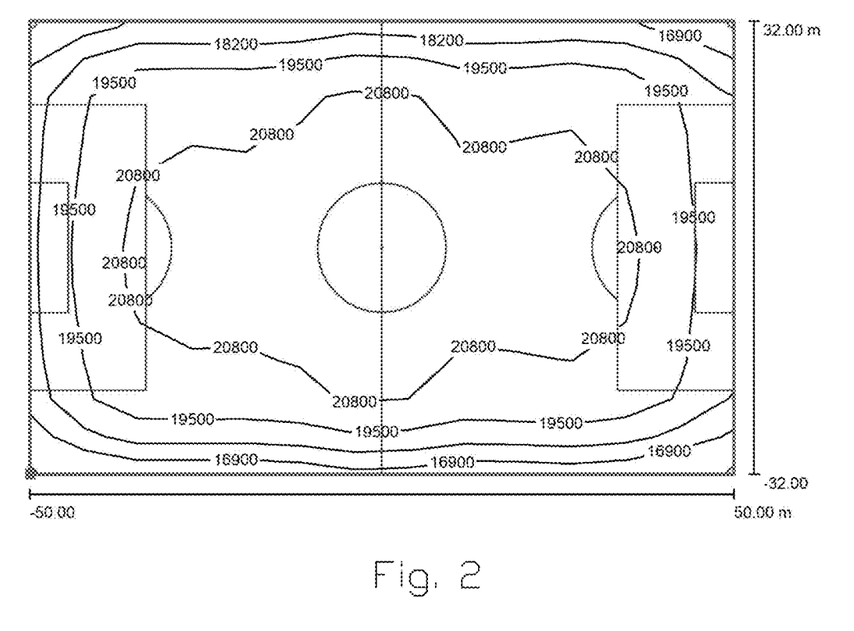
FIG. 2 shows a simulated contour plot of light intensity isolines using 506 luminaires shown in FIG. 1 to illuminate a target area that is 100 meters long and 64 meters wide.

FIG. 2 shows a simulated contour plot of light intensity isolines. The calculation is based on a soccer field 100 m long and 64 m wide. The luminaires 1 as shown in FIG. 1, are located 32 m above ground, and 506 luminaires 1 are distributed evenly above the field such that the beam of lights 19 are perpendicular to the ground. The simulation shows that the center of the field is illuminated at an intensity above 20,000 lux and a substantial portion of the field is illuminated close to 20,000 lux and above.

Figure 3:
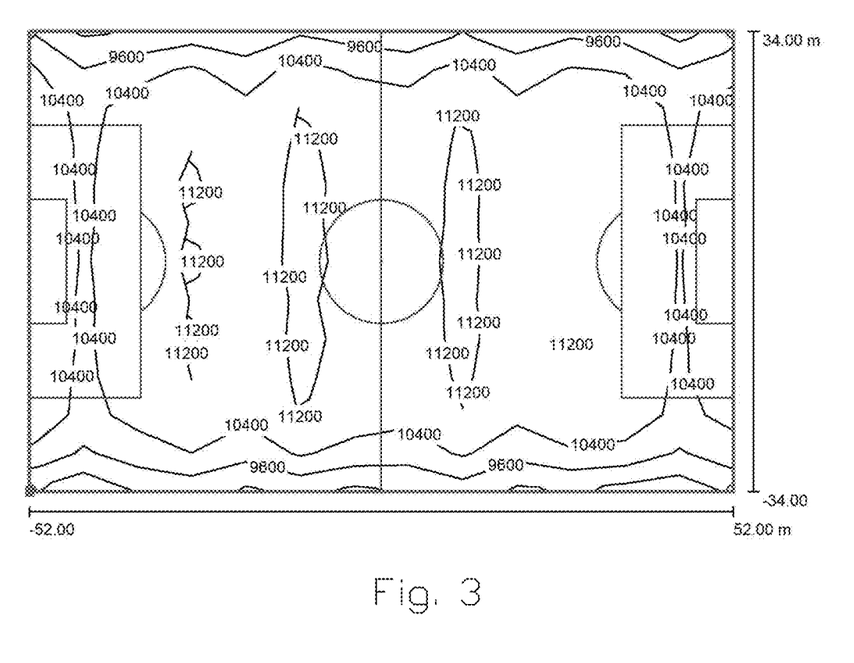
FIG. 3 shows a simulated contour plot of light intensity isolines (lux) using 306 luminaires shown in FIG. 1 to illuminate a target area that is 104 meters long and 68 meters wide.

FIG. 3 shows a simulation based on 306 luminaires distributed evenly above a soccer field that is 104 m long and 68 m wide such that the beam of lights 19 are perpendicular to the ground. The simulation shows that the center of the field is illuminated at an intensity above 10,000 lux and a substantial portion of the field is illuminated close to 10,000 lux and above.

The simulations shown in FIGS. 2 and 3 show that a lighting system 3 according to the invention is able to illuminate grass at a distance to stimulate grass growth.

Figure 4:
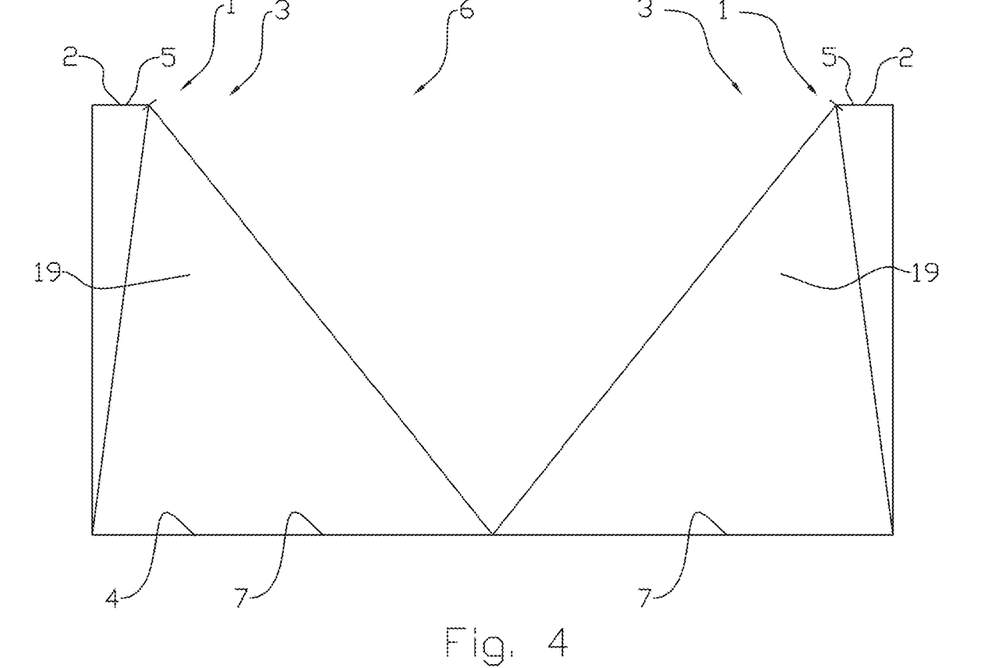
FIGS. 4-6 show schematically how a grass field is illuminated by a lighting system according to the invention.
Figure 5:
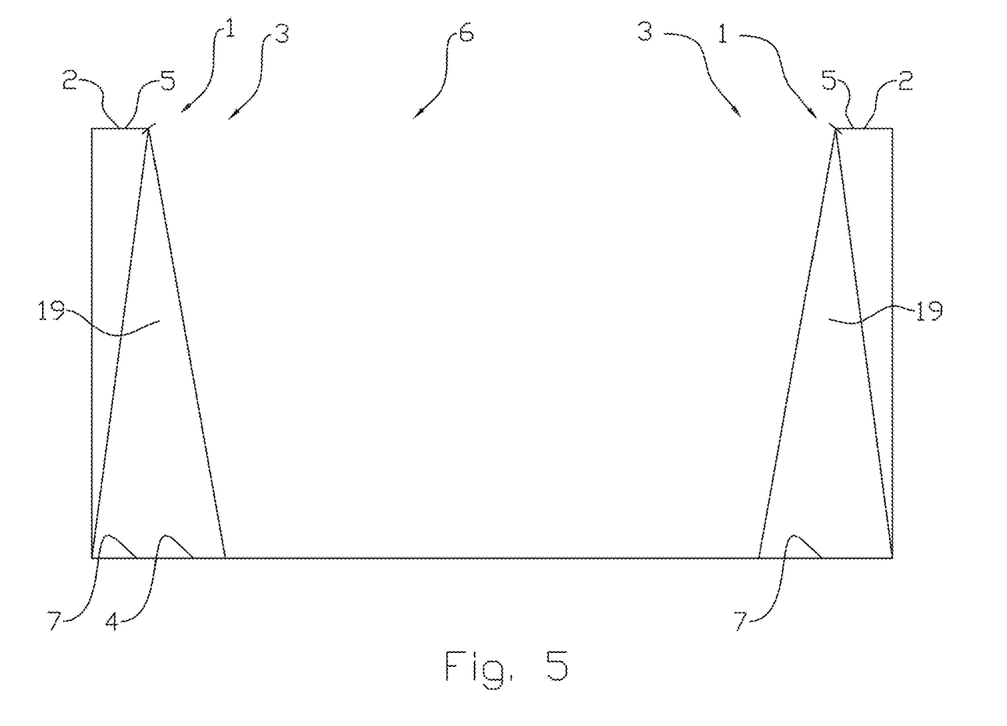
Figure 6:
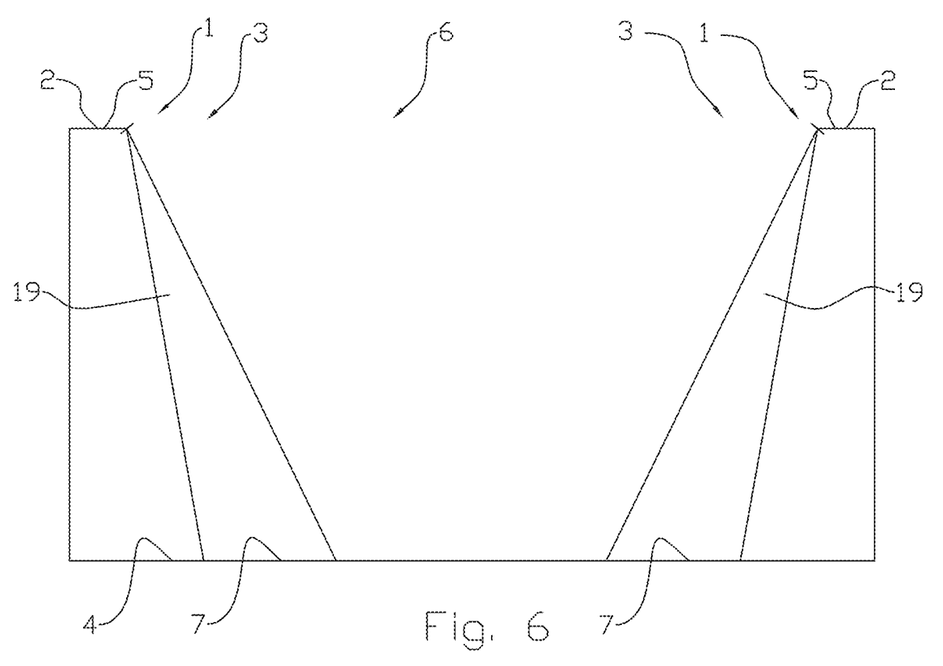
Figure 7:
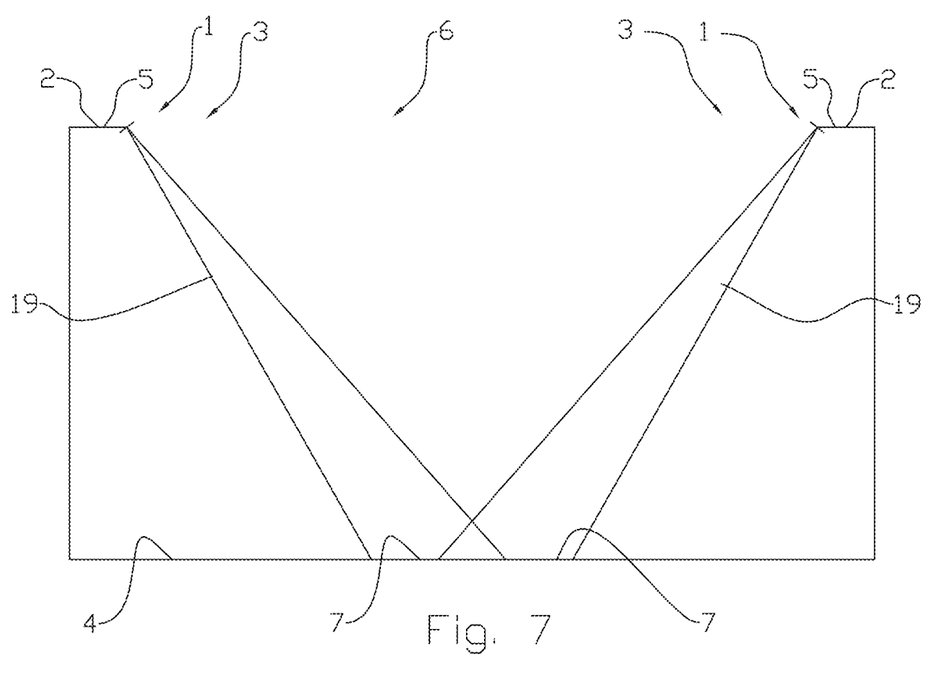
FIG. 7 shows schematically the same as FIGS. 4-6, but with partly overlapping beams of light.

FIGS. 4-7 show schematically how the lighting system 3 illuminates a grass field 4. In FIG. 4 a plurality of luminaires 1 are mounted on a support 2, schematically shown as a roof 5 of stadium 6. The plurality of luminaires 1 illuminate the whole grass field 4. In FIGS. 5-6, the plurality of luminaires 1 illuminate ⅓ of the grass field. The plurality of luminaires 1 are tiltable. Thereby, the whole grass field 4 may be illuminated by adjusting successively the angle of the luminaires 1. In FIG. 7 less than ⅓ of the grass field is illuminated. The beam of lights 19 overlap to increase the light intensity at the edge portion of each footprint 7 created by the beam of light 19.

FIG. 8 shows the footprint 7 on a ground 40 of a beam of light 19 from one luminaire 1. The light is emitted from the luminaires 1 at a beam angle 10 of 5.5° measured from the edge 130 of the frame 13 of the luminaires 1. The footprint 7 is calculated based on that the luminaires 1 is mounted 32 m above the ground 40 and the beam of light 19 is oriented perpendicular to the ground 40. The dimensions are for illustration of the invention only, and the dimensions will change with height above the ground, dimensions of the luminaires 1, beam angle 10, and direction of beam of light relative to the ground 40.

A schematic curve 8 shows the intensity of light within the beam of light 19. The light intensity is at a maximum M at the centre of the beam of light 19. The light intensity drops at an increasing distance from the centre. The curve shows where light intensity has dropped to half of maximum ½M. As seen in FIG. 8, this defines the full width half maximum FWHM beam angle.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A lighting system for providing photosynthetically stimulating artificial light to a specified target area where such artificial light is needed, said lighting system comprising at least one luminaire with a light source, wherein the luminaire emits photosynthetically stimulating light at a narrow beam angle of less than and including 20° (FWHM), the lighting system further comprising means for positioning the at least one luminaire at a distance of minimum 20 m from the specified target area measured in a light beam direction, and wherein the luminaire is adapted to illuminate the specified target area with a minimum photosynthetic photon flux density of 140 µmol/s/m$^2$.

2. The lighting system according to claim 1, wherein the luminaire emits photosynthetically stimulating light at a narrow beam angle of more than and including 3° (FWHM).

3. The lighting system according to claim 1, wherein the luminaire illuminates the specified target area with a minimum of 210 µmol/s/m$^2$.

4. The lighting system according to claim 1, wherein the specified target area is illuminated with a lighting uniformity of at least 0.6.

5. The lighting system according to claim 1, wherein the light source comprises LED lamps.

6. The lighting system according to claim 1, wherein the light source comprises laser diodes.

7. The lighting system according to claim 1, wherein the luminaire is mounted tiltable.

8. The lighting system according to claim 1, wherein the light source is tiltable relative to the luminaire.

9. The lighting system according to claim 1, wherein the means for positioning the at least one luminaire comprises a rim portion of a roof of a sports stadium.

10. The lighting system according to claim 1, wherein the means for positioning the at least one luminaire comprises alight mast.

11. The lighting system according to claim 1, wherein the lighting system comprises a monitoring system for monitoring and estimation of a need for artificial lighting on all parts of the specified target area in order to obtain acceptable growth conditions.

12. The lighting system according to claim 11, wherein the monitoring system comprises at least one camera.

13. The lighting system according to claim 1, wherein the lighting system comprises a floodlighting system.

14. A floodlighting system for illuminating a grass field of a stadium, wherein the floodlighting system comprises a lighting system for providing photosynthetically stimulating artificial light to a specified target area where such artificial light is needed, said lighting system comprising at least one luminaire with a light source, wherein the luminaire emits photosynthetically stimulating light at a narrow beam angle of less than and including 20° (FWHM), the lighting system further comprising means for positioning the at least one luminaire at a distance of minimum 20 m from the specified target area measured in a light beam direction, and wherein the luminaire is adapted to illuminate the specified target area with a minimum photosynthetic photon flux density of 140 µmol/s/m$^2$.

15. A method for improving growth conditions for plants in need of light at a specified target area by exposing the plants to a photosynthetically artificial light from a light source, wherein the method comprises to provide a luminaire comprising the light source, said luminaire is adapted to emit the photosynthetically artificial light at a narrow beam angle of less than and including 20° (FWHM), the light source is positioned at a distance of minimum 20 m from the specified target area, and the plants in the specified target area are illuminated with a minimum photosynthetic photon flux density of 140 µmol/s/m$^2$.

16. The method according to claim 15, wherein the specified target area is illuminated with a minimum of 210 µmol/s/m$^2$.

17. The method according to claim 15, wherein the specified target area comprises grass in a stadium.

\* \* \* \* \*